(12) United States Patent
Washisu et al.

(10) Patent No.: US 8,626,500 B2
(45) Date of Patent: Jan. 7, 2014

(54) APPARATUS AND METHOD FOR NOISE REDUCTION AND SOUND RECORDING

(75) Inventors: Koichi Washisu, Tokyo (JP); Masafumi Kimura, Kawasaki (JP); Fumihiro Kajimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 831 days.

(21) Appl. No.: 12/833,563

(22) Filed: Jul. 9, 2010

(65) Prior Publication Data

US 2011/0022403 A1 Jan. 27, 2011

(30) Foreign Application Priority Data

Jul. 27, 2009 (JP) ................................ 2009-174740

(51) Int. Cl.
*G10L 21/02* (2013.01)

(52) U.S. Cl.
USPC .......................................................... 704/226

(58) Field of Classification Search
None
See application file for complete search history.

(56) References Cited

U.S. PATENT DOCUMENTS

| | | | | |
|---|---|---|---|---|
| 7,433,475 B2 * | 10/2008 | Wakui | ........................... | 381/94.1 |
| 7,697,699 B2 * | 4/2010 | Ozawa | ........................... | 381/94.1 |
| 7,769,188 B2 * | 8/2010 | Wakui | ........................... | 381/94.1 |
| 2005/0063553 A1 * | 3/2005 | Ozawa | ........................... | 381/92 |
| 2006/0176546 A1 * | 8/2006 | Wakui | ........................... | 359/337 |

FOREIGN PATENT DOCUMENTS

| | | |
|---|---|---|
| JP | 01-286633 A | 11/1989 |
| JP | 2008-053802 | 3/2008 |
| JP | 2008-211526 A | 9/2008 |

OTHER PUBLICATIONS

The above references were cited in a May 7, 2013 Japanese Office Action, which is enclosed without English Translation, that issued in Japanese Patent Application No. 2009-174740.

* cited by examiner

*Primary Examiner* — Talivaldis Ivars Smits
(74) *Attorney, Agent, or Firm* — Cowan, Liebowitz & Latman, P.C.

(57) ABSTRACT

A sound recording apparatus having a driving unit generates a sound signal from an input sound, detects the level of the sound signal, adjusts the level of the generated sound signal at an amplification factor corresponding to the detected level, and processes the adjusted sound signal to prevent an amplified sound signal from containing a sound signal generated upon driving the driving unit. The sound recording apparatus controls to replace a sound signal in a predetermined period after instructing driving of the driving unit with a signal calculated from a sound signal in the first period after the predetermined period, and to substantially equalize an amplification factor when driving of the driving unit is instructed and that in the first period.

12 Claims, 11 Drawing Sheets

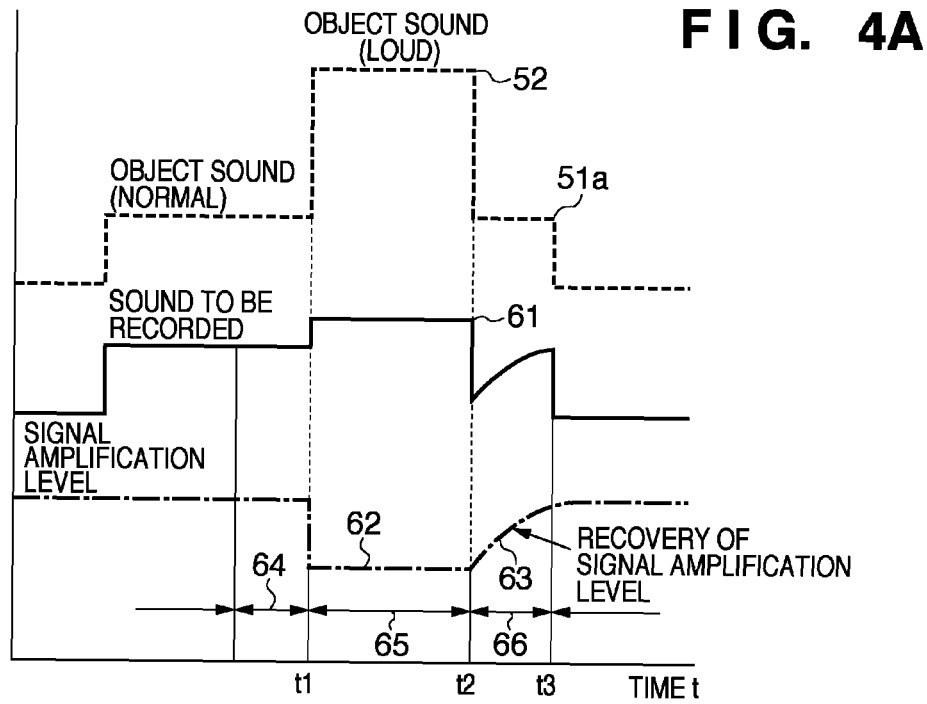
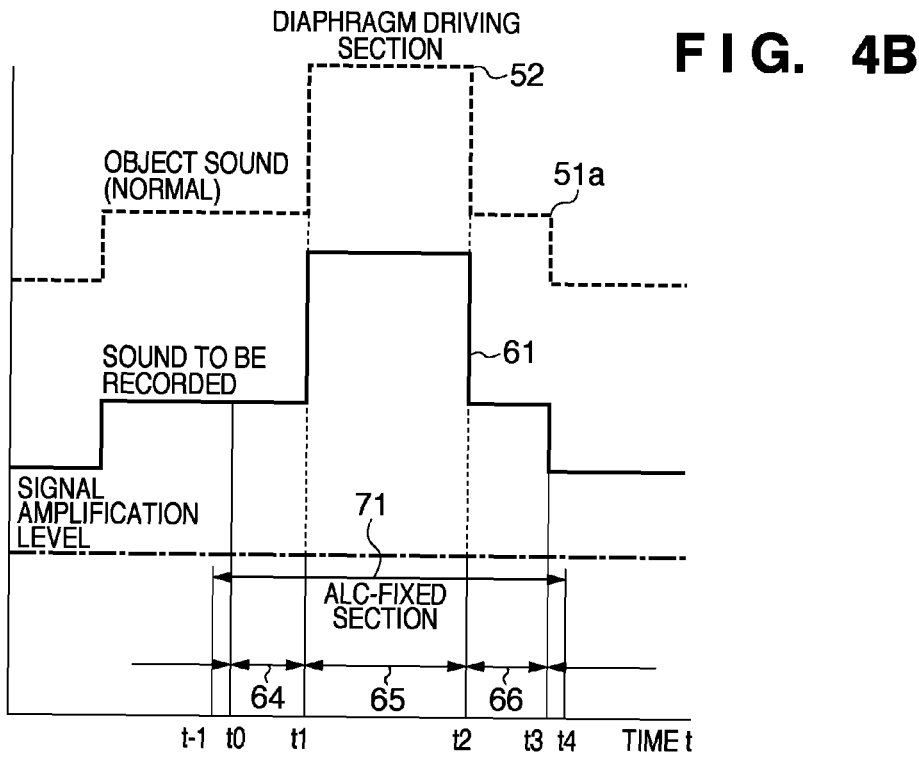

APPARATUS AND METHOD FOR NOISE REDUCTION AND SOUND RECORDING

BACKGROUND OF THE INVENTION

1. Field of the Invention

The present invention relates to a sound recording apparatus and method.

2. Description of the Related Art

Recent photographing apparatus such as a camera are gaining more sophisticated functions, and many cameras have an advanced function capable of shooting both moving and still images. In moving image shooting, the photographing apparatus acquires a sound at the same time as acquiring an image, and records it in synchronism with the image.

However, the photographing apparatus such as a camera includes driving sources to adjust the optical system and the like, and the driving sounds from these driving sources are recorded as noise. Even the sound of a manipulation by the user propagates as vibrations through the housing of the photographing apparatus, and is recorded as noise. To solve these problems, various sound processing circuits and photographing apparatus have been proposed.

Japanese Patent Laid-Open No. 2008-053802 discloses a method of masking the head unloading sound of a hard disk. More specifically, a sound signal at a portion where the head unloading sound of the hard disk was generated is generated using preceding and succeeding reference sounds, thereby masking the head unloading sound. ITU-T Recommendation G.711-Appendix I describes a method of concealing a packet loss in sound transmission as a technique regarding transmission and demodulation of a sound. More specifically, a signal at a portion suffering a packet loss is generated by prediction using a reference sound signal before the loss, thereby concealing the packet loss.

In the conventional technique disclosed in Japanese Patent Laid-Open No. 2008-053802, a predicted sound is generated by performing calculation to predict a sound signal in a noise-generated section using, as reference sounds, object sounds before and after the noise-generated section. The generated predicted sound replaces a sound in the noise-generated section. The predicted sound is generated by, for example, successively predicting the next sample of a sound signal using the continuity of the sound waveform. Alternatively, detecting the repetition frequency of a sound and repeating the waveform in a predetermined cycle generate the predicted sound. This means that the precision of the reference sound needs to be high to generate a predicted sound with high precision. However, the precision of reference sounds decreases before and after the noise-generated section. This problem will be explained.

A general recorder includes a gain control circuit called an auto level control (ALC) circuit. When the object sound is loud, the ALC function decreases the amplification gain of a postamplifier for the sound detected by a microphone and records the sound, thereby preventing saturation of the sound signal. When the object sound is soft, the ALC function increases the amplification gain of the postamplifier for the sound detected by the microphone and records the sound, thereby increasing the S/N ratio of the sound signal. In this way, the ALC function finely changes the gain of a sound signal detected by the microphone in accordance with the loudness (sound pressure level) of the object sound. If the ALC function operates in the above-mentioned reference sounds generated section, the continuity of the sound pressure with a preceding object sound is lost, decreasing the precision of the predicted sound. That is, when the next sample of a sound signal is successively predicted using the continuity of the sound waveform, the continuity of the sound pressure is lost, failing prediction of the next sample. Also when the repetition frequency of a sound is detected to repeat the waveform in a predetermined cycle, detection of the repetition frequency of the sound fails. This results in poor precision of the predicted sound. This problem is not limited to when generating a predicted sound using reference sounds before and after the noise-generated section, as described in Japanese Patent Laid-Open No. 2008-053802. The precision of the predicted sound decreases even when the ALC amplification gain before a noise-generated section and that in the noise-generated section differ from each other in generating a predicted sound by synthesizing a reference sound before the noise-generated section and a sound in the noise-generated section. This also applies to a case wherein a sound in the noise-generated section is synthesized with a reference sound after a noise reduction section. This problem occurs not only when generating a predicted sound for noise removal processing, but also when, for example, a special effect is used to synthesize temporally preceding and succeeding object sounds. For example, the sound of a moving image is divided into a plurality of sections and the sections are synthesized. In this case, if the sections to be synthesized differ in ALC, their sound pressures become discontinuous, and no high-precision special effect (appropriate special effect) may be obtained.

SUMMARY OF THE INVENTION

The present invention has been made to solve the above problems, and one aspect of the invention provides a sound recording apparatus and method for suppressing a decrease in the precision of sound processing.

According to one aspect of the present invention, there is provided a sound recording apparatus having a driving unit, comprising: a sound collection unit configured to generate a sound signal from an input sound; a detection unit configured to detect a level of the sound signal; an adjustment unit configured to adjust a level of the sound signal at an amplification factor corresponding to the detected level of the sound signal; a processing unit configured to process the sound signal adjusted by the adjustment unit to prevent a sound signal amplified by the adjustment unit from containing a sound signal generated upon driving the driving unit; and a control unit configured to control driving of the driving unit, the adjustment unit, and the processing unit, wherein the control unit controls the processing unit to replace a sound signal in a predetermined period that begins after instructing driving of the driving unit with a signal calculated from a sound signal included in a first period that begins after the predetermined period has elapsed, and controls the adjustment unit to substantially equalize an amplification factor when driving of the driving unit is instructed and an amplification factor in the first period.

Also, according to another aspect of the present invention, there is provided a sound recording apparatus having a driving unit, comprising: a sound collection unit configured to generate a sound signal from an input sound; a detection unit configured to detect a level of the sound signal; an adjustment unit configured to adjust a level of the sound signal at an amplification factor corresponding to the detected level of the sound signal; a processing unit configured to process the sound signal adjusted by the adjustment unit to prevent a sound signal amplified by the adjustment unit from containing a sound signal generated upon driving the driving unit; and a control unit configured to control driving of the driving unit, the adjustment unit, and the processing unit, wherein the control unit controls the processing unit to replace a sound signal in a predetermined period that begins after instructing driving of the driving unit with a signal calculated from a sound signal included in a first period that begins after the predetermined period has elapsed, and controls the adjustment unit to increase the amplification factor more quickly at least in the first period than in a remaining period.

Furthermore, according to another aspect of the present invention, there is provided a sound recording method in a sound recording apparatus having a driving unit, the method comprising: a sound collection step of generating a sound signal from an input sound; a detection step of detecting a level of the sound signal; an adjustment step of adjusting a level of the sound signal at an amplification factor corresponding to the detected level of the sound signal; a processing step of processing the sound signal adjusted in the adjustment step to prevent a sound signal amplified in the adjustment step from containing a sound signal generated upon driving the driving unit; and a control step of controlling driving of the driving unit, and processes in the adjustment step and the processing step, wherein in the control step, the processing step is controlled to replace a sound signal in a predetermined period after instructing driving of the driving unit with a signal calculated from a sound signal in a first period after the predetermined period, and the adjustment step is controlled to substantially equalize an amplification factor when driving of the driving unit is instructed and an amplification factor in the first period.

Furthermore, according to another aspect of the present invention, there is provided a sound recording method in a sound recording apparatus having a driving unit, the method comprising: a sound collection step of generating a sound signal from an input sound; a detection step of detecting a level of the sound signal; an adjustment step of adjusting a level of the sound signal at an amplification factor corresponding to the detected level of the sound signal; a processing step of processing the sound signal adjusted in the adjustment step to prevent a sound signal amplified in the adjustment step from containing a sound signal generated upon driving the driving unit; and a control step of controlling driving of the driving unit, and processes in the adjustment step and the processing step, wherein in the control step, the processing step is controlled to replace a sound signal in a predetermined period after instructing driving of the driving unit with a signal calculated from a sound signal in a first period after the predetermined period, and the adjustment step is controlled to increase the amplification factor more quickly at least in the first period than in a remaining period.

According to one aspect of the invention, a decrease in the precision of sound processing can be suppressed.

Further features and aspects of the present invention will become apparent from the following description of exemplary embodiments with reference to the attached drawings.

BRIEF DESCRIPTION OF THE DRAWINGS

FIGS. 4A and 4B are timing charts for explaining the relationship between generation of noise and the ALC-fixed section;

DESCRIPTION OF THE EMBODIMENTS

Preferred embodiments of the present invention will be described below with reference to the accompanying drawings. The following embodiments do not limit the claims of the present invention, and not all combinations of features set forth in the embodiments are essential for solving means of the present invention.

First Embodiment

Figure 1:
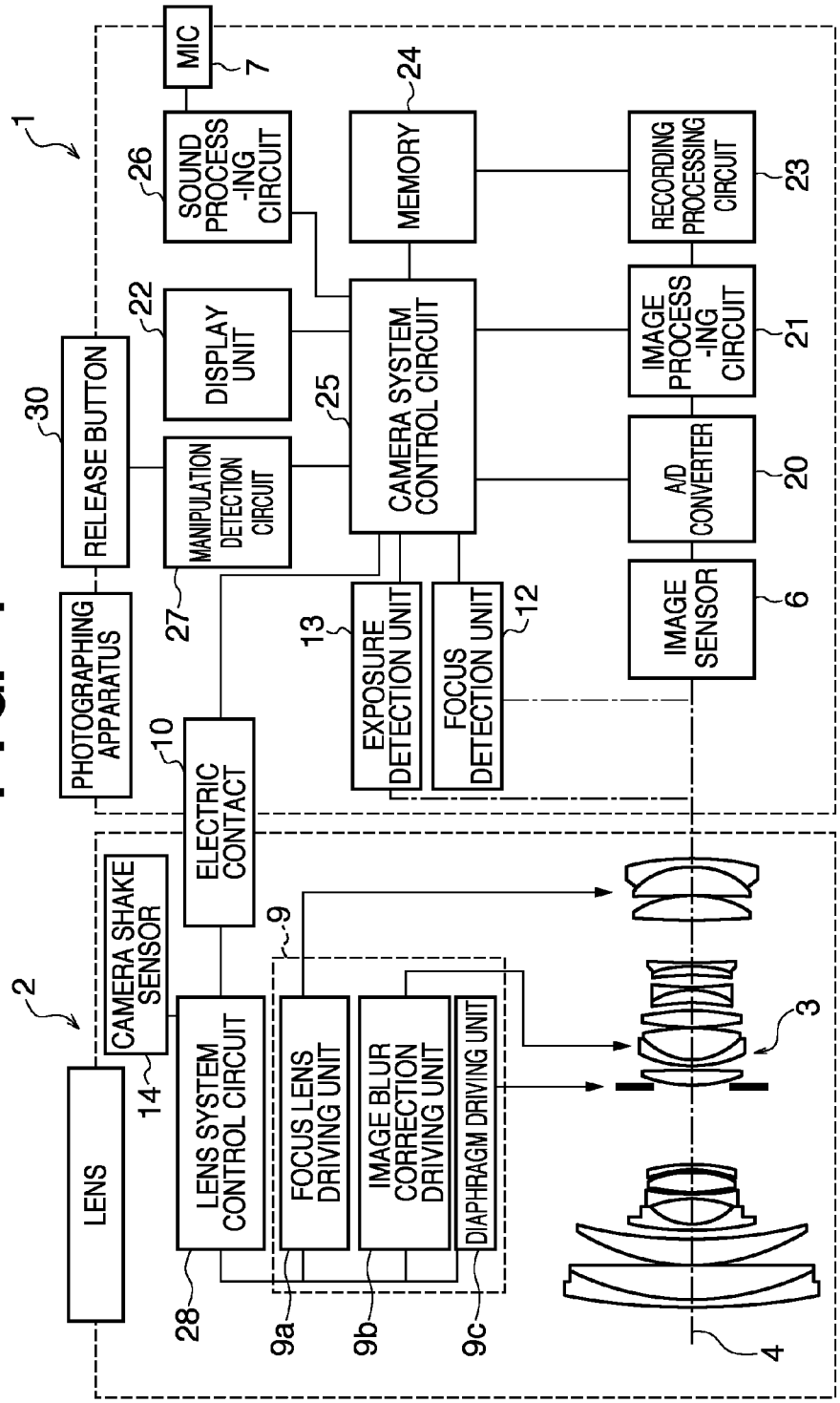
FIG. 1 is a block diagram of a photographing apparatus according to an embodiment.

FIG. 1 is a block diagram exemplifying the arrangement of a photographing apparatus according to the first embodiment. In the first embodiment, a digital single-lens reflex camera is used as an apparatus capable of shooting a moving image. However, the present invention is not limited to this and is also applicable to a compact digital camera, a cell phone capable of shooting a moving image, and the like. Note that the operation of shooting still and moving images by a digital camera is described in various references, and a description thereof will be omitted.

In FIG. 1, reference numeral 1 denotes a photographing apparatus; 2, a lens attached to the photographing apparatus; and 4, an optical axis of the lens. The lens barrel stores the building components of the lens 2. The photographing apparatus 1 and photographing lens 2 are mechanically connected via a predetermined lens attachment mechanism, and electrically connected via an electric contact 10. The digital camera formed from the photographing apparatus 1 and lens 2 includes an imaging system, image processing system, sound processing system, recording/playback system, and control system. The imaging system includes a photographing optical system 3 and image sensor 6. The image processing system includes an A/D converter 20 and image processing circuit 21. The sound processing system includes a microphone 7 and sound processing circuit 26. The recording/playback system includes a recording processing circuit 23 and a memory 24 serving as a storage unit. The control system includes a camera system control circuit 25 serving as a control unit, a focus detection unit (including an AF sensor) 12, an exposure detection unit (including an AE sensor) 13, a camera shake sensor 14, a manipulation detection circuit 27, a lens system control circuit 28, a release button 30, and an optical system driving unit 9. The optical system driving unit 9 includes a focus lens driving unit 9a, image blur correction driving unit 9b, and diaphragm driving unit 9c. A display unit 22 includes a display which is attached to the rear surface of the photographing apparatus 1 and formed from, for example, a liquid crystal display. The display unit 22 displays a variety of images on the display.

The microphone 7 functions as, for example, a sound collection means for converting an ambient sound into an electrical signal to acquire a sound signal. In the sound processing system, the sound processing circuit 26 performs appropriate processing for a signal obtained by the microphone 7, generating a recording sound signal. In moving image shooting, the recording processing circuit 23 (to be described later) links the generated recording sound signal to an image and compresses it. The recording processing circuit 23 outputs an image signal to the memory 24, and generates and saves an image to be output to the display unit 22. The recording processing circuit 23 compresses an image, moving image, sound, and the like using a predetermined method.

The camera system control circuit 25 is connected to the focus detection unit 12 and exposure detection unit 13. In still image shooting, the camera system control circuit 25 obtains a proper focus position and stop position based on signals from the focus detection unit 12 and exposure detection unit 13. The camera system control circuit 25 issues an instruction to the lens system control circuit 28 via the electric contact 10, and the lens system control circuit 28 controls the focus lens driving unit 9a and diaphragm driving unit 9c. For example, when the object to be photographed becomes bright, the image sensor 6 or the exposure detection unit 13 including the AE sensor detects it, and notifies the camera system control circuit 25 of this information. The camera system control circuit 25 outputs a signal (diaphragm driving instruction signal) to the lens system control circuit 28 to cause the diaphragm driving unit 9c to drive a stop (not shown) arranged in the photographing optical system 3. The camera system control circuit 25 includes a CPU and memory, and controls each block of the photographing apparatus 1.

Shooting accompanied by sound recording such as so-called moving image shooting will be explained. In shooting accompanied by sound recording, a sound (to be referred to as a mechanical driving sound) generated upon driving the camera body and lens actuator is an unwanted sound and becomes noise.

Figure 2:
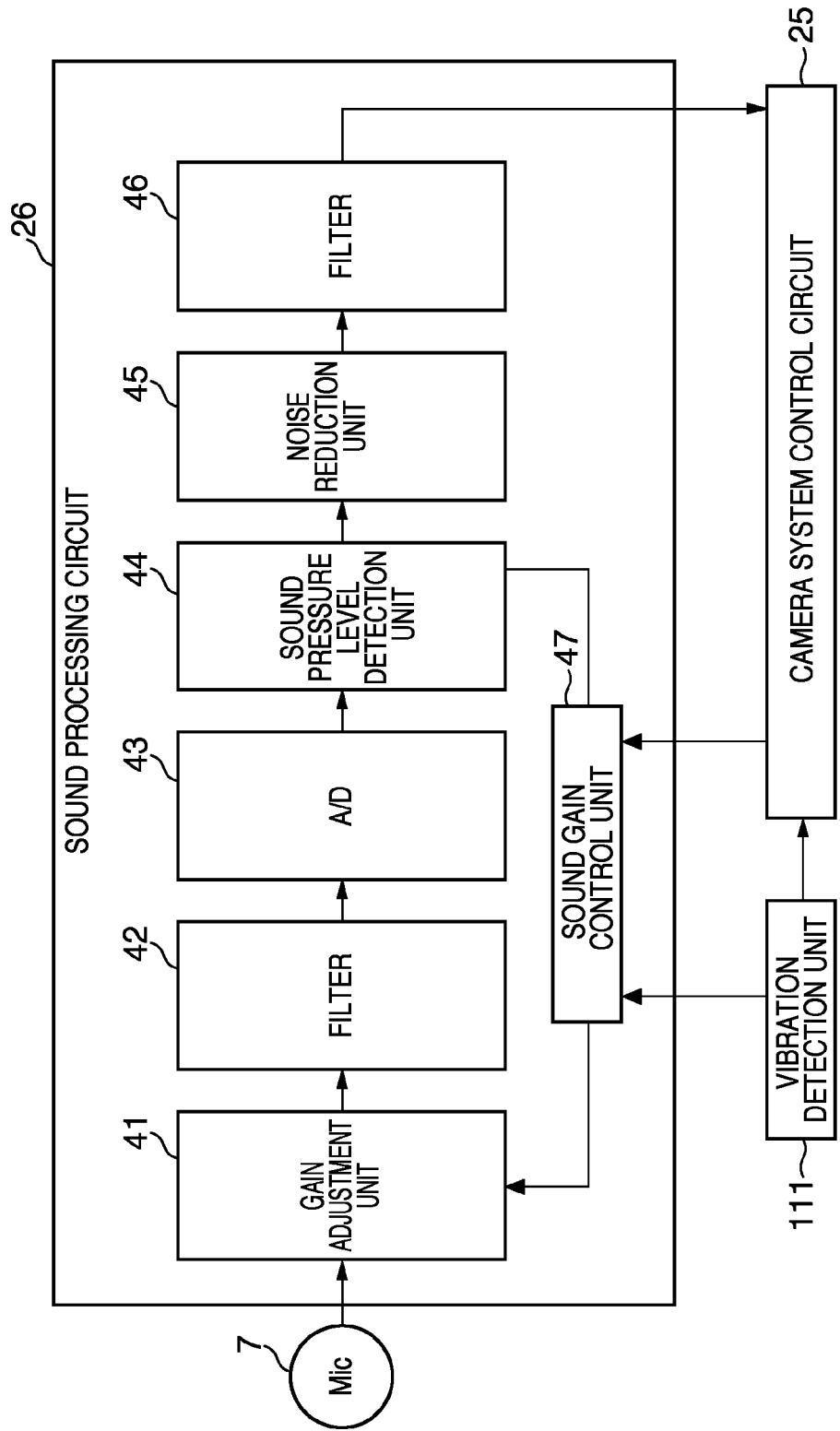
FIG. 2 is a block diagram of a sound processing circuit according to the embodiment.

FIG. 2 is a block diagram showing the detailed arrangement of the sound processing circuit 26 according to the first embodiment. A signal obtained from the microphone 7 is supplied to a gain adjustment unit 41. The gain adjustment unit 41 adjusts the signal amplification level of the microphone 7 to fully utilize the dynamic range of an A/D converter 43. The level adjustment will be described later. A filter 42 is formed from, for example, a low-pass filter having a cutoff frequency suited to the sampling frequency of the A/D converter 43. When the microphone 7 is located near an element which generates a specific frequency, the filter 42 may include a proper notch filter in addition to the low-pass filter. The A/D converter 43 converts a signal processed by the gain adjustment unit 41 and filter 42 into digital data. A sound pressure level detection unit 44 detects the A/D-converted sound pressure level. When the sound pressure level detected by the sound pressure level detection unit 44 exceeds a threshold (for example, ½ of the saturation level), a sound gain control unit 47 decreases the above-mentioned signal amplification level of the gain adjustment unit 41. If the A/D-converted sound pressure level is lower than a threshold (for example, ¼ of the saturation level), the sound gain control unit 47 increases the signal amplification level of the gain adjustment unit 41. In this way, the gain adjustment unit 41, sound pressure level detection unit 44, and sound gain control unit 47 form an auto gain change unit (auto level control: ALC) which automatically changes the gain (amplification factor) used for recording in accordance with the loudness of a sound input from the microphone 7.

A noise reduction unit 45 processes a sound signal containing noise generated upon, for example, driving the diaphragm driving unit 9c of the camera, thereby reducing noise in the sound in the noise-mixed section. More specifically, the noise reduction unit 45 removes an object sound signal in the noise-generated section. The noise reduction unit 45 predicts an object sound (sound prediction) in the noise-generated section using reference signals in sections (learning sections) before and after the noise-generated section (object sounds before and after a predetermined region, that is, noise-generated section). The noise reduction unit 45 replaces the original signal in the noise-generated section with the predicted object sound, complementing the sound signal. In the sound prediction, for example, the next sample of a sound signal is successively predicted using the continuity of the sound waveform. Alternatively, the repetition frequency of the sound may be detected to repeat the waveform in a predetermined cycle. That is, the sound prediction processing generates a signal which replaces one in the noise-generated section by using the sound of a reference signal. The first embodiment will exemplify driving of the diaphragm driving unit 9c, but the present invention is also applicable to a case wherein noise is mixed upon driving another driving unit (camera body, lens, or actuator). A filter 46 is used to perform suitable filter processing, as needed, after noise processing. The filter 46 is formed from a bandpass filter which passes only sounds in a human audible sound band of, for example, 20 Hz to 20 kHz. If noise processing is unnecessary, the filter 46 can only transmit a sound or execute proper delay without performing noise processing. A vibration detection unit 111 is adopted in the second embodiment and can be omitted in the first embodiment.

Sound prediction to successively predict the next sample (value) of a sound signal using the continuity of the sound waveform will be explained. Derivation (learning operation) of a linear prediction coefficient used in the sound prediction, and prediction (prediction operation) of a signal using the linear prediction coefficient will be described. In the use of linear prediction, the following linear combination is assumed between a current signal and a finite number (p in this case) of sample values adjacent to the current signal:

$$x_t + \alpha_1 x_{t-1} + \ldots + \alpha_p x_{t-p} = \epsilon_t \quad (1)$$

where $\epsilon_t$ indicates random variables which have no correlation, a mean value of 0 and a variance of $\sigma^2$. Rewriting equation (1) to predict $x_t$ from past values yields:

$$x_t = \hat{x}_t + \varepsilon_t = -\alpha_1 x_{t-1} - \ldots - \alpha_p x_{t-p} + \varepsilon_t = -\sum_{i=1}^{p} \alpha_i x_{t-i} + \varepsilon_t \quad (2)$$

From equation (2), if $\epsilon_t$ is sufficiently small, the current value is expressed by the linear sum of p neighboring values.

If the approximation of $x_t$ obtained by this prediction is satisfactory, $x_{t+1}$ is also calculated by the linear sum of p neighboring values in the same way.

As long as $\epsilon_t$ is sufficiently small, predicted signals can be sequentially obtained.

How to determine $\alpha_i$ which minimizes $\epsilon_t$ will be examined.

In this specification, an operation to determine $\alpha_i$ which minimizes $\epsilon_t$ will be called a learning operation. It suffices to minimize the sum of squares of $\epsilon_t$ in the above-mentioned learning section. Letting $t_0$ be the learning start time and $t_1$ be the learning end time, we have $$\sum_{t=t_0}^{t_1} \varepsilon_t^2 = \sum_{t=t_0}^{t_1} \left( \sum_{i=0}^{p} \alpha_i x_{t-i} \right)^2 = \sum_{t=t_0}^{t_1} \sum_{i=0}^{p} \sum_{j=0}^{p} \alpha_i \alpha_j x_{t-i} x_{t-j} \quad (3)$$

for $\alpha_0=1$. To simplify equation (3), we assume $$c_{ij} = \sum_{t=t_0}^{t_1} x_{t-i} x_{t-j} \quad (4)$$

Then, to determine $\alpha_i$ which minimizes the solution of equation (3), equation (3) is solved by setting a partial derivative for $\alpha_j$ (j=1, 2, . . . , p) in that equation to 0:

$$\frac{\partial}{\partial \alpha_i} \sum_{t=t_0}^{t_1} \varepsilon_t^2 = \frac{\partial}{\partial \alpha_i} \left( \sum_{i=0}^{p} \sum_{j=0}^{p} \alpha_i c_{ij} \alpha_j \right) = 2 \sum_{i=0}^{p} \alpha_i c_{ij} = 0 \quad (5)$$

Equation (5) reveals that $\alpha_i$ can be determined by solving p simultaneous linear equations. In equation (5), $c_{ij}$ can be obtained from $x_{t-i}$ (i=1, 2, . . . , p). In other words, $\alpha_i$ can be obtained from equation (5).

When $\alpha_i$ is determined in accordance with equation (5), the sum of squares of $\varepsilon_t$ is minimized. From equation (2), the $x_t$ value can be satisfactorily approximated by $\hat{x}_t$. If this approximation is satisfactory, $\hat{x}_t$ can be used as a predicted signal instead of $x_t$. Also for $x_{t-1}$, its approximate value can be obtained from (p−1) neighboring signals and a predicted signal. By sequentially repeating this processing, signals in the prediction section can be generated.

By using $\alpha_i$ determined in this fashion, the predicted signal of a sound in the prediction section is obtained. In this specification, an operation to obtain the approximation (predicted signal) of a prediction section using the determined $\alpha_i$ will be called a prediction operation. A preferred learning operation and prediction operation will be explained below.

Figure 3:
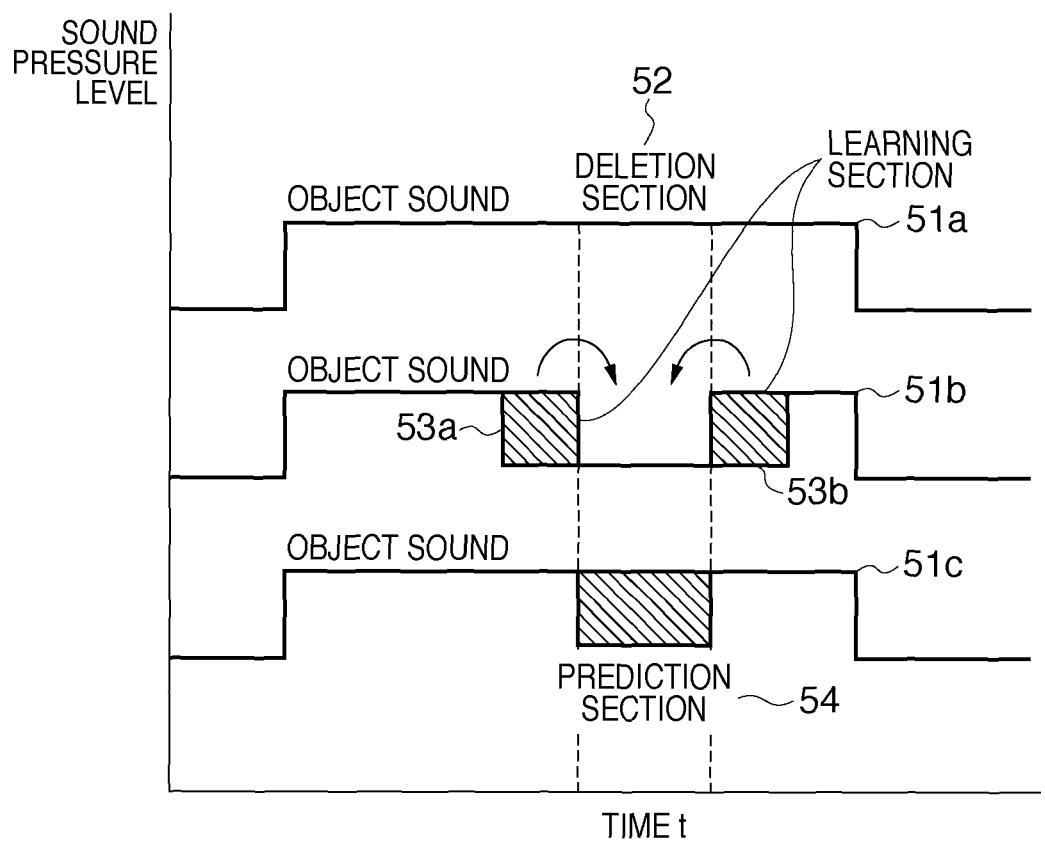
FIG. 3 is a timing chart for explaining sound processing including noise processing.

FIG. 3 schematically shows an object sound. The abscissa axis represents time, and the ordinate axis represents the sound pressure level. In the first embodiment, a sound predicted by calculation overwrites (replaces) a sound in a section (noise-generated section) where noise was generated upon driving a driving unit such as the diaphragm driving unit. For this purpose, when the noise reduction unit 45 detects a diaphragm driving instruction signal, it temporarily stores a sound in the memory.

In the first embodiment, the noise reduction unit 45 assumes that noise generated upon driving the stop is mixed in a period of, for example, 100 msec to 200 msec after detecting the diaphragm driving instruction signal. The section where noise was generated will be called a deletion section. Referring to FIG. 3, in an original object sound 51a, noise is superposed in a deletion section 52 serving as the first section. The noise reduction unit 45 assumes, as a learning section 53a before the noise-generated section, a period of, for example, 10 msec to 100 msec after detecting the diaphragm driving instruction signal. The noise reduction unit 45 also assumes, as a learning section 53b after the noise-generated section, a period of, for example, 200 msec to 300 msec after detecting the diaphragm driving instruction signal. In the first embodiment, the noise reduction unit 45 determines sections in this fashion upon detecting the diaphragm driving instruction signal. By using a sound predicted by the above-described prediction processing, the noise reduction unit 45 performs noise removal processing for the sound temporarily stored in the memory before recording on the recording medium. In this case, the noise reduction unit 45 first deletes an object sound in the deletion section 52 of the sound stored in the memory.

An object sound 51b is obtained by deleting the object sound in the deletion section 52. The noise reduction unit 45 executes the prediction operation using object sounds in the learning sections 53a and 53b before and after the deletion section 52 that are stored in the memory. Signals predicted by the prediction operation in the respective learning sections are weighted and synthesized. The resultant predicted signal is embedded in the deletion section 52. An object sound 51c is obtained by embedding the predicted signal in a prediction section 54 of the object sound 51b. In this manner, neighboring signals before and after the prediction section 54 (identical to the deletion section 52) are used to execute the learning operation. This utilizes the fact that a sound signal is relatively highly repetitive within a very short-time region.

The above-described sound prediction calculation is executed independently for two signals in the learning sections 53a and 53b. Performing the learning operation in the learning section 53a before the prediction section 54 and generating a signal in the prediction section 54 will be called forward prediction. Performing the learning operation in the learning section 53b after the prediction section 54 and generating a signal in the prediction section 54 will be called backward prediction.

A signal in the prediction section 54 is obtained by executing appropriate calculation to mix predicted values so that the weight of a value in forward prediction becomes high in a section close to the learning section 53a and that of a value in backward prediction becomes high in a section close to the learning section 53b. Note that backward prediction cannot be done in real time. In practice, when the noise reduction unit 45 detects the diaphragm driving instruction signal, it temporarily stores an object sound only by a predetermined section in the memory or the like. Then, the noise reduction unit 45 replaces, with a predicted sound, a sound in a noise-generated section (corresponding to the deletion section 52) where noise is superposed in the stored sound. After that, the sound is recorded on the recording medium. An object sound may be temporarily stored in the memory only when sound prediction is performed. Even when no prediction is done, an object sound may always be temporarily stored in the memory and then recorded on the recording medium. In the first embodiment, when no prediction is performed, an object sound is recorded on the recording medium without storing it in the memory.

The reason why noise processing can be done not in real time upon detecting a sound but until a sound is recorded after detecting it will be explained.

As described with reference to the block diagram of FIG. 1, the camera system control circuit 25 controls driving of the stop, so the timing to drive the stop (driving of the stop or the like generates noise) is known. In the first embodiment, therefore, when the noise reduction unit 45 detects the diaphragm driving instruction signal, it stores, in the memory, sound data of a predetermined time (for example, 300 msec) after detecting the diaphragm driving instruction signal. The noise reduction unit 45 assumes that noise generated upon driving the stop is mixed in a period of, for example, 100 msec to 200 msec after detecting the diaphragm driving instruction signal. The noise reduction unit 45 assumes, as the learning section 53a before the noise-generated section, a period of, for example, 10 msec to 100 msec after detecting the diaphragm driving instruction signal. The noise reduction unit 45 also assumes, as the learning section 53b after the noise-generated section, a period of, for example, 200 msec to 300 msec after detecting the diaphragm driving instruction signal. In the first embodiment, the noise reduction unit 45 determines sections in this way upon detecting the diaphragm driving instruction signal. By using a sound predicted by the above-described prediction processing, the noise reduction unit 45 performs noise removal processing for the sound temporarily stored in the memory before recording on the recording medium. The noise reduction unit 45 replaces the sound in the noise section with the predicted sound based on reference sounds in the preceding and succeeding learning sections before sound recording.

Next, auto gain change control (to be referred to as auto level control: ALC) will be described.

The ALC function is implemented by the gain adjustment unit 41, sound pressure level detection unit 44, and sound gain control unit 47 in the sound processing circuit 26, as shown in FIG. 2. The ALC function automatically changes the gain. FIG. 4A shows a general ALC operation. The abscissa axis represents time, and the ordinate axis represents the sound pressure level or gain level (since there are two scales, no scale is plotted on the ordinate axis).

The object sound 51a indicated by the dotted line has a normal sound pressure till time t1. The object sound becomes loud (equal to or larger than ½ of the recording saturation level) in a period of time t1 to time t2, and then returns to the normal sound pressure level. In FIG. 4A, when a large object sound is generated in a period of time t1 to time t2, the ALC function operates to prevent saturation of the sound signal, and the gain adjustment unit 41 decreases the signal amplification level of the microphone. Hence, a sound 61 to be recorded indicated by the solid line is not recorded as loud as the object sound 51a in the section of t1 to t2. When the object sound returns to the original sound pressure at time t2, the ALC function operates again, and the gain adjustment unit 41 gradually returns the signal amplification level of the microphone to the original one. The signal amplification level is "gradually returned" because if it abruptly returns, the continuity of the sound is lost and an unnatural sound is recorded. However, as is apparent from the schematic view of FIG. 4A, the sound 61 to be actually recorded changes the sound pressure level from time t2 to time t3, failing high-precision recording. Discontinuity of the sound is perceived very unnaturally, so it is important not to abruptly change the signal amplification level. A change of the signal amplification level with a predetermined time constant is also a cause of decreasing the recording precision, as described above. As shown in FIG. 4A, an ALC signal amplification level 62 (chain line) temporarily decreases at time t1 and slowly returns from time t2 to time t3. At time t1, the signal amplification level 62 is decreased not gradually but abruptly in order to prevent sudden saturation of the signal.

The relationship between the noise reduction unit and the ALC function will be explained with reference to FIGS. 3 and 4A. Assume that the stop is driven in an object sound (loud) section 65 in FIG. 4A, noise generated upon driving the stop is mixed, and the object sound level changes like the object sound 51a. In this case, the object sound (loud) section 65 in FIGS. 4A and 4B corresponds to the deletion section 52 in FIG. 3. As described with reference to FIG. 3, a sound in the prediction section 54 is predicted using reference sounds in the preceding and succeeding learning sections 53a and 53b. In FIG. 4A, a preceding learning section 64 and a succeeding learning section 66 are set. In FIG. 4A, the reference sound (sound 61 to be recorded) in the preceding learning section 64 is obtained by recording the object sound 51a at a predetermined signal amplification level. By using this reference sound, a sound to replace one in the deletion section (deletion section 52 in FIG. 3 or object sound (loud) section 65 in FIG. 4A) can be predicted with high precision. To the contrary, the reference sound (sound 61 to be recorded) in the succeeding learning section 66 is obtained by recording the object sound 51a at a variable signal amplification level. That is, the reference sound in the succeeding learning section 66 of the sound 61 to be recorded is attained by the ALC operation, as described above. For this reason, the sound prediction precision in the deletion section (deletion section 52 in FIG. 3 or object sound (loud) section 65 in FIG. 4A) using the reference sound in the succeeding learning section 66 decreases greatly.

In the first embodiment, the signal amplification level of the gain adjustment unit 41 is fixed in a section undergoing sound prediction to prevent a decrease in sound prediction precision caused by a change of the signal amplification level. More specifically, the signal amplification level of the gain adjustment unit 41 is fixed in a section including the preceding learning section 64, noise-generated section 65, and succeeding learning section 66, as shown in FIG. 4B. This section is defined as an ALC-fixed section 71. In the ALC-fixed section 71, the sound gain control unit 47 fixes the signal amplification level at an immediately preceding level regardless of a change of the sound pressure of the object sound. Even in the succeeding learning section 66, the object sound is recorded at a predetermined signal amplification level. This can prevent a decrease in the precision of a sound predicted based on the succeeding learning section 66. Accordingly, a sound signal containing noise generated upon driving the stop in the diaphragm driving section (deletion section 52) can be replaced with a high-quality predicted sound generated from reference sounds in the preceding and succeeding learning sections 64 and 66. Since the ALC level is fixed for the sound 61 to be recorded, the object sound 51a becomes loud enough to saturate the circuit in the deletion section 52 corresponding to the diaphragm driving section. However, since the sound in this section is deleted, no problem occurs even if saturation of the sound occurs. In the first embodiment, the signal amplification level is fixed in the section including the preceding learning section 64, noise-generated section 65, and succeeding learning section 66. The sound in the noise-generated section 65 is deleted and a sound to replace it is obtained by prediction using sounds in the preceding and succeeding learning sections 64 and 66. When processing sounds in the preceding and succeeding learning sections 64 and 66, like the first embodiment, the signal amplification level in the noise-generated section 65 need not be fixed. It suffices to control the signal amplification level at a predetermined value in the preceding and succeeding learning sections 64 and 66.

In the first embodiment, the ALC level is fixed from time t−1 before time t0. In actual shooting, not only a sound generated upon driving the stop, but also the sound of manipulating the photographing apparatus by the user are superposed in an object sound. This sound propagates through the housing of the photographing apparatus, and is input as a very loud sound to the microphone. Such a sound is generated in a short time. However, if the ALC function operates every time the sound is generated, return of the ALC level requires a long time, as represented by a waveform 63 shown in FIG. 4A. An object sound during the return cannot then be used as a reference sound for prediction. To prevent variations of the ALC level in the learning sections 64 and 66, a section longer than one including the learning sections 64 and 66 is set as the ALC-fixed section 71 (from time t−1 to time t4).

The ALC-fixed section 71 is set especially when reducing noise generated by a driving unit driven in accordance with an instruction from the photographing apparatus, like driving of the stop. More specifically, when the photographing apparatus outputs an instruction to, for example, drive the lens stop, it can determine that the stop will be driven. Generation of noise by driving the stop can therefore be predicted, and the ALC-fixed section 71 can be set. Note that the camera system control circuit 25 includes a function of predicting generation of such noise, that is, specifying a noise-generated section. The camera system control circuit 25 instructs the sound gain control unit 47 to inhibit changing the signal amplification level for a predetermined period (period during which sound processing is done) so as to fix the signal amplification level in the gain adjustment unit 41 in this section. For example, the camera system control circuit 25 issues an instruction to fix the signal amplification level at a level set before driving the stop. While the sound gain control unit 47 receives this instruction, it keeps the gain constant in the gain adjustment unit 41.

Figure 5A:
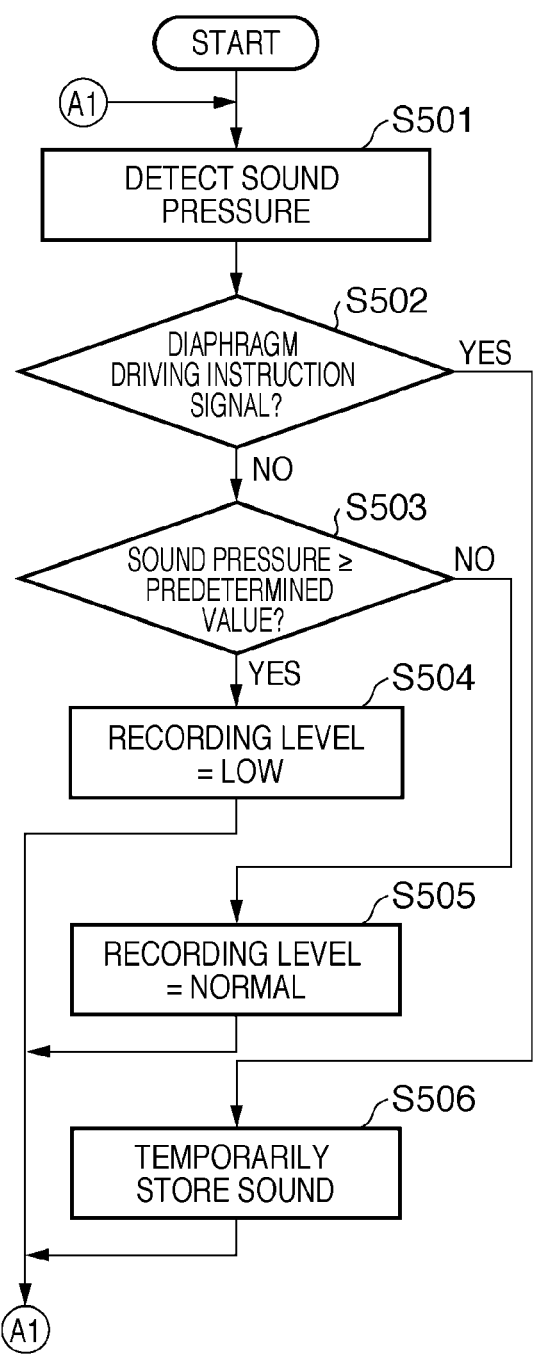
FIGS. 5A and 5B are flowcharts for explaining gain control and noise processing according to the first embodiment.
Figure 5B:
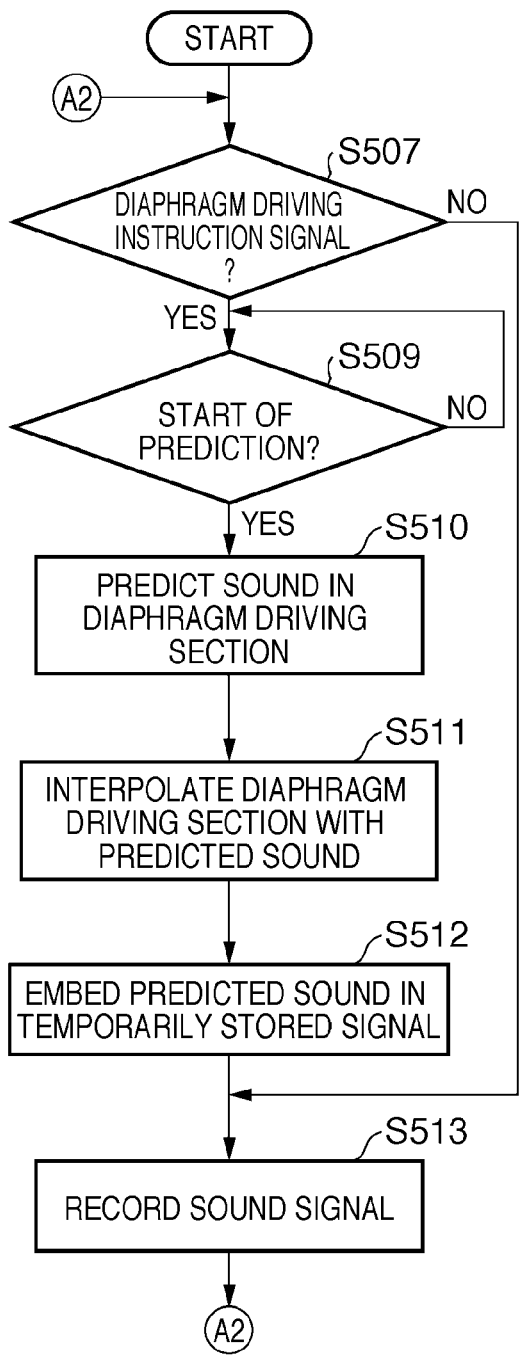

FIGS. 5A and 5B are flowcharts for explaining sound recording processing according to the first embodiment. This sequence starts when the digital camera starts recording in moving image shooting. For descriptive convenience, the flowcharts of FIGS. 5A and 5B show processes necessary for a description of the first embodiment, and do not show other general processes. In the first embodiment, when no prediction is done, a sound is recorded on the recording medium without storing it in the memory.

An object sound input to the microphone 7 is amplified by the gain adjustment unit 41, undergoes filter processing by the filter 42, and is A/D-converted by the A/D converter 43. In step S501, the sound pressure level detection unit 44 detects the sound pressure of the A/D-converted object sound. In step S502, the sound gain control unit 47 detects whether the camera system control circuit 25 has output a diaphragm driving instruction signal, and determines whether to drive the stop. If the stop is not to be driven, the process advances to step S503; if the stop is to be driven, to step S506. If the stop is to be driven, processes in steps S503 to S505 are skipped, changing the gain by the ALC function is inhibited, and the recording level is fixed. This section serves as the ALC-fixed section 71 where the signal amplification level in the gain adjustment unit 41 is fixed. In the first embodiment, the ALC gain is fixed at an immediately preceding level in the ALC-fixed section 71, but is not limited to this. For example, in the ALC-fixed section, the ALC level may be fixed at a predetermined level. For example, if it is determined in step S502 to drive the stop, the process may advance to step S505 to fix the ALC level at a normal recording level in the ALC-fixed section.

Figure 6:
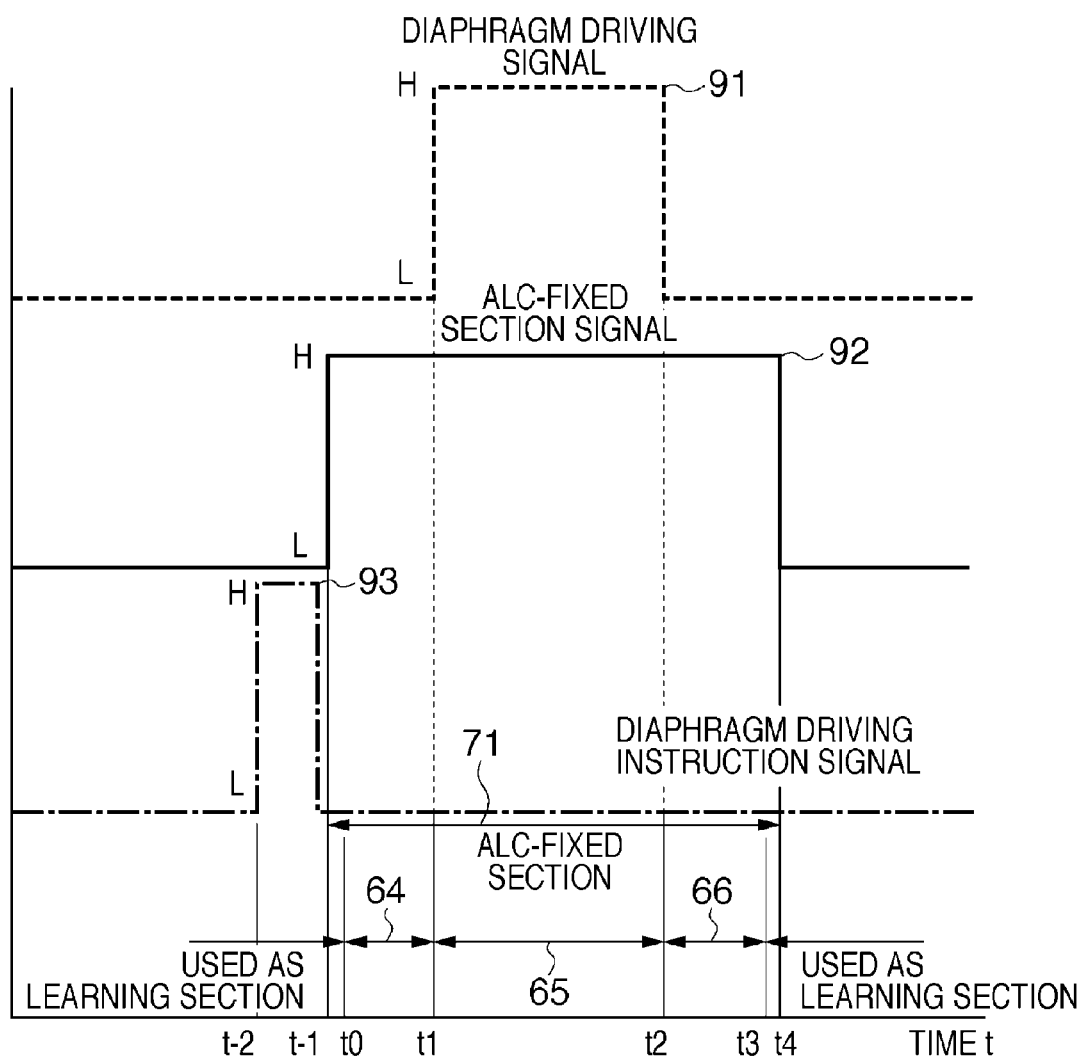
FIG. 6 is a timing chart for explaining driving of the stop and the ALC-fixed section.

This example concerns the deletion section 52 arising from driving of the stop, and the ALC-fixed section 71 is a predetermined period corresponding to the diaphragm driving section. The "ALC-fixed driving section" will be described in detail. FIG. 6 is a chart for explaining the relationship between the ALC-fixed driving section and the diaphragm driving section. The abscissa axis represents time, and the ordinate axis represents the state of each signal. H is signal ON and L is signal OFF. While an ALC-fixed section signal 92 shown in FIG. 6 is ON (H), the sound gain control unit 47 inhibits changing the gain by the ALC function.

When the object to be photographed becomes bright and the exposure needs to be compensated by narrowing down the stop, the camera system control circuit 25 outputs at time t−2 a diaphragm driving instruction signal 93 indicated by the chain line. In response to this, the camera system control circuit 25 outputs the ALC-fixed section signal 92 to the sound gain control unit 47 at time t−1. The camera system control circuit 25 sets a learning section of, for example, 0.1 sec from time to, and then outputs a diaphragm driving signal 91. The lens system control circuit 28 causes the diaphragm driving unit 9c to drive the stop in accordance with the diaphragm driving signal 91. In this way, prior to diaphragm driving, the camera system control circuit 25 outputs the ALC-fixed section signal 92 which ensures the preceding learning section 64. The timing when a noise-generated section appears is determined based on a control signal associated with driving of a mechanism such as the stop arranged in the digital camera. The ALC-fixed section is determined to further contain a learning section set before the determined noise-generated section. Note that the control signal is a diaphragm driving instruction signal in this example, but is not limited to this. For example, a user manipulation signal or the like (for example, zoom change manipulation) can also be detected as the control signal.

The ALC-fixed section signal 92 is output from the start of the preceding learning section 64 or a time earlier than that, stably fixing the signal amplification level in the learning section 64. The diaphragm driving time is as almost constant as, for example, about 0.1 sec. The period up to time t4 including the diaphragm driving signal generation period (deletion section 65) and the succeeding learning section 66 is set as the ON period of the ALC-fixed section signal 92. It is also possible to monitor the diaphragm driving signal and disable the ALC-fixed section signal 92 upon the lapse of the period of the learning section after disabling the diaphragm driving signal. While the ALC-fixed section signal 92 is ON, the signal amplification level is fixed at a predetermined level or standard level. The ALC-fixed section signal 92 is output till the end of the succeeding learning section or time t4 later than that, thereby fixing the signal amplification level in the succeeding learning section 66.

As is apparent from FIG. 6, the ALC-fixed section signal 92 makes the ALC-fixed section 71 a long section including the actual diaphragm driving signal 91. This prevents the influence of variations of the ALC level on an object sound in the learning section. In other words, the signal amplification level is fixed prior to the diaphragm driving instruction, so the object sound in the learning section is free from the influence of variations of the ALC level.

In step S503, the sound gain control unit 47 determines whether the sound pressure of the object sound detected in step S501 is equal to or higher than a predetermined level. If the sound pressure is equal to or higher than the predetermined level, the process advances to step S504, and the gain adjustment unit 41 decreases the recording level. If the sound pressure is lower than the predetermined level, the process advances to step S505 to set a normal recording level. The ALC function executed in S503 to S505 decreases the gain when the sound pressure is equal to or higher than the predetermined level. Instead, the gain may be increased when the sound pressure is lower than the predetermined level. If the diaphragm driving instruction signal is detected, the process advances to step S506. In step S506, the object sound is recorded at the set level and temporarily stored. In the temporary storage, for example, a memory (not shown) arranged in the sound gain control unit 47 is usable. The object sound is temporarily stored because a signal (succeeding learning section) after the section subjected to prediction processing is used, as described above.

This is gain change control executed in a predetermined period including learning sections before and after the noise-generated section, in order to reduce the influence of variations of the gain on generation of a predicted sound. If necessary, the temporarily stored sound undergoes noise processing to be described below, and is recorded as a recorded sound. Note that the processes in FIGS. 5A and 5B are executed apparently parallelly. In step S507, the noise reduction unit 45 determines whether the camera system control circuit 25 has output a diaphragm driving instruction signal, and determines whether to drive the stop. If it is determined in step S507 to drive the stop, the process advances to step S509; if not to drive it, to step S513.

If it is determined in step S507 not to drive the stop, the process shifts to step S513 to record the sound signal on the recording medium. If it is determined in step S507 to drive the stop, the process shifts to steps S509 to S512 to execute the foregoing prediction processing and the like, thereby achieving noise removal processing. In step S509, the noise reduction unit (sound gain control unit 47) determines whether to start prediction, based on whether the learning section 66 is completed. If switching of the diaphragm driving signal 91 to the OFF state is detected and the lapse of a period corresponding to the learning section 66 is detected, it is determined to start prediction. Alternatively, if the completion of the ALC-fixed section (shift of the ALC-fixed section signal 92 to the OFF state) is detected, it may be determined to start prediction.

If it is determined in step S509 to start prediction, the process advances to step S510. In step S510, the noise reduction unit (sound gain control unit 47) predicts a sound in the deletion section from sound signals in the learning sections before and after the deletion section. In step S511, the noise reduction unit (sound gain control unit 47) embeds the sound predicted in step S510 in the deletion section. In step S512, a sound signal having undergone noise processing is embedded in one having undergone no noise processing, and the two sound signals are temporarily aligned. The process then advances to step S513.

Sound data obtained by replacing the sound in the noise section with the predicted sound in step S512 is temporarily stored in the memory. In step S513, the sound processing circuit 26 records the sound data in the memory 24. For example, the sound processing circuit 26 records, in the memory 24, a sound signal in which the sound signal having undergone noise processing has been embedded in step S512. A sound signal other than one in the diaphragm driving section is directly written in the memory 24.

Note that the processes in steps S507 to S513 shown in FIG. 5B may not be executed by the digital camera, and a sound signal recorded by the digital camera may be processed by an external information processing apparatus (for example, personal computer). In this case, a signal obtained in step S504 or S505 is recorded on the recording medium of the camera together with the diaphragm driving section signal 92 and diaphragm driving signal 91. The external information processing apparatus performs the above-mentioned sound signal noise processing based on the diaphragm driving section signal and diaphragm driving signal recorded together with the sound signal.

Figure 7A:
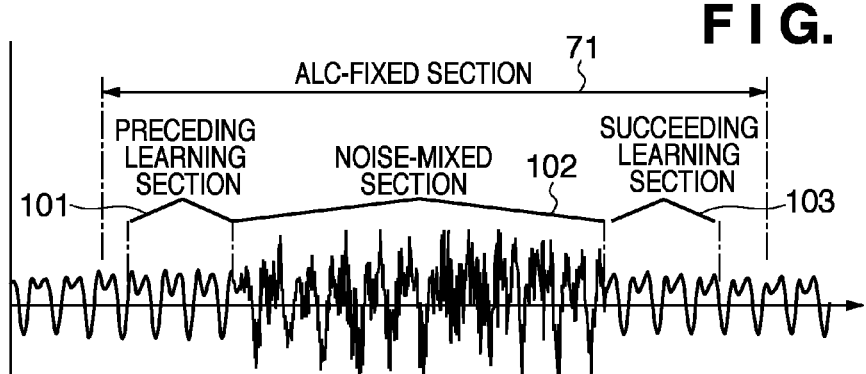
FIGS. 7A to 7E are charts for explaining a predicted sound and interpolation in the ALC-fixed section.
Figure 7B:
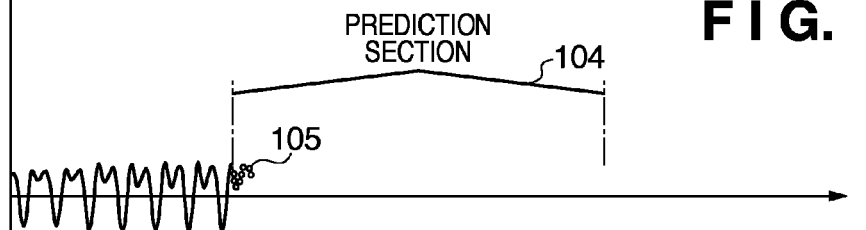
Figure 7C:
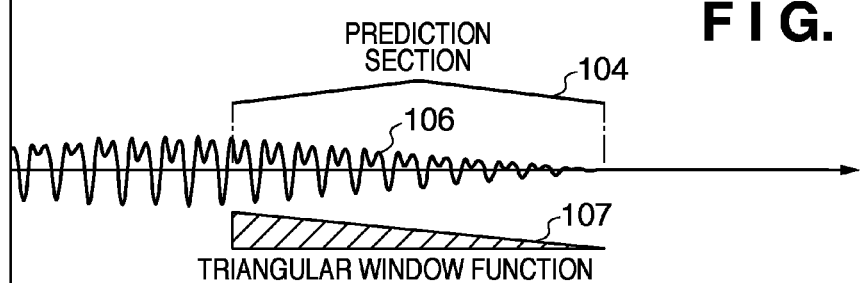
Figure 7D:
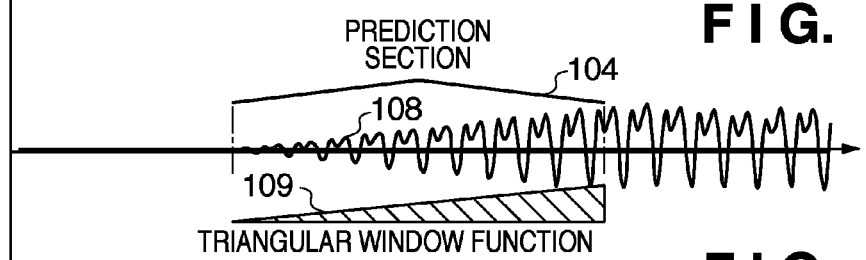
Figure 7E:
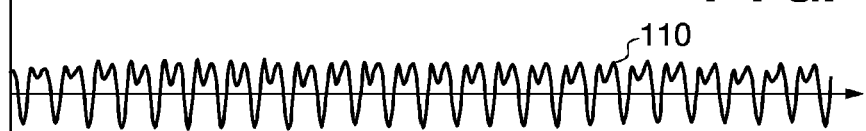

FIGS. 7A to 7E are charts showing sound signals in the first embodiment of the present invention. The abscissa axis represents time, and the ordinate axis represents the sound pressure level. FIG. 7A shows a state in which diaphragm driving noise is mixed in an object sound signal in a noise-mixed section 102. FIG. 7B shows a sound signal waveform (predicted waveform 105) while a sound in a prediction section 104 (corresponding to the noise-mixed section 102) is predicted using a preceding learning section 101. FIG. 7C shows a signal 106 obtained by multiplying the predicted signal in FIG. 7B by a triangular window function 107. FIG. 7D shows a signal obtained by multiplying, by a window function 109, the result of backward sound prediction for the prediction section 104 (noise-mixed section 102). FIG. 7E shows a waveform 110 obtained by adding the prediction results in FIGS. 7C and 7D and interpolating the sound signal in the noise-mixed section 102.

In prediction processing, first, the ALC-fixed section 71 is determined based on the diaphragm driving section signal 92 output from the camera system control circuit 25. The ALC-fixed section 71 corresponds to the diaphragm driving section signal 92 output from the camera system control circuit 25 based on the noise-mixed section 102 (section where diaphragm driving noise is superposed in the object sound), the preceding learning section 101, and a succeeding learning section 103 shown in FIG. 7A.

Then, as shown in FIG. 7B, the sound signal in the preceding learning section 101 is extended in every cycle (for example, 44 kHz) (predicted waveform 105). As shown in FIG. 7C, the predicted signal shown in FIG. 7B before multiplying the window function is multiplied by the triangular window function 107, completing the forward predicted signal 106. The predicted signal at this stage will be called a window function-multiplied predicted signal. When the number of data in the prediction section is N+1 and data immediately after the start of prediction is n=0, the window function wf(t) is given by wf(n)=(N−n)/N.

As shown in FIG. 7D, the same processing is executed for a section immediately after the noise-mixed section 102, generating a window function-multiplied backward predicted signal 108 using the window function 109. The triangular window function 109 by which a backward predicted signal before multiplication is multiplied is symmetrical to that in forward prediction and is given by wr(n)=n/N. As shown in FIG. 7E, the sound processing circuit 26 adds the window function-multiplied forward predicted signal 106 and window function-multiplied backward predicted signal 108. The sound processing circuit 26 replaces the sound signal in the noise-mixed section with the resultant predicted signal, ending the interpolation.

Forward and backward predicted signals before multiplication are multiplied by the triangular window functions and added. As a result, a forward predicted signal and a sound signal immediately after the noise-mixed section are smoothly connected while a backward predicted signal and a sound signal immediately before the noise-mixed section are smoothly connected. As shown in FIG. 7A, the ALC-fixed section 71 is set longer than a period including the preceding learning section 101 and succeeding learning section 103. The sound signal in this section is free from variations of the sound pressure caused by the ALC function. Only the object sound in the noise-mixed section can be predicted with high precision.

As described above, according to the first embodiment, changing the signal amplification level in the gain adjustment unit 41 is inhibited in a period including entire learning sections before and after a noise-generated section where noise is generated upon driving the stop. The sound in the noise-generated section can be predicted with higher precision and higher quality.

In the first embodiment, the signal amplification level is fixed in a period including the preceding learning section 64, noise-generated section 65, and succeeding learning section 66. However, the sound in the noise-generated section 65 is deleted, and a sound to replace it is predicted from sounds in the preceding and succeeding learning sections 64 and 66. When processing sounds in the preceding and succeeding learning sections 64 and 66, like the first embodiment, the signal amplification level in the noise-generated section 65 need not be fixed. It suffices to control the signal amplification level at a predetermined value in the preceding and succeeding learning sections 64 and 66.

Prediction processing in the first embodiment may be done according to another algorithm based on a sound input from the microphone, as described above. Also in this case, it suffices to control the signal amplification level at a predetermined value for sound signals in learning sections (reference sections) used in sound processing. For example, a sound obtained based on a reference sound in the preceding learning section 64 and that in the noise-generated section 65 may be synthesized at a predetermined ratio using a window function. In this case, sound processing uses only sounds in the preceding learning section 64 and noise-generated section 65. The signal amplification level in this section suffices to be fixed at a predetermined value or immediately preceding value.

The first embodiment has described processing using prediction as a noise processing method. However, the technique in the embodiment can be employed even when the sound is processed using a plurality of sections of an input sound for the purpose of a special sound effect or the like. More specifically, when the timing when a special sound effect is executed is detected, the signal amplification level in a section used to process the special sound effect is controlled at a predetermined value, preventing a decrease in the precision of the special effect.

In the first embodiment, noise removal processing is executed for a sound corresponding to driving of the stop. Noise removal processing may be done for a sound corresponding to driving of another driving unit.

The duration of a period serving as the noise-generated section may be changed depending on the degree of driving the stop (for example, 1-step driving or 3-step driving). At the same time, the duration of a period serving as the ALC-fixed section may be changed. For example, both the noise-generated section and ALC-fixed section are set longer in 3-step driving than in 1-step driving. That is, both the noise-generated section and ALC-fixed section are set longer in a driving operation for a longer driving time.

Second Embodiment

A photographing apparatus to which a sound processing system according to the second embodiment is applied will be described. A vibration detection unit 111 shown in FIG. 2 is added to the sound processing system in the second embodiment. The vibration detection unit 111 is formed from an accelerometer or the like, arranged near a microphone 7 serving as a recording device, and detects vibrations which are generated in the camera and propagate to the microphone 7. A sound processing circuit 26 sets the signal amplification level in a gain adjustment unit 41 to a predetermined level or immediately preceding level in accordance with an output from the vibration detection unit 111.

Vibrations which are generated in the camera and serve as a cause of noise include not only vibrations upon driving such as driving of the stop described in the first embodiment, but also those upon rubbing the camera when the user manipulates it. A camera system control circuit 25 cannot detect such vibrations, unlike the driving signal. Vibrations upon rubbing the camera are input as very large vibrations to the microphone 7, and are superposed as noise in an object sound. Hence, the section where the camera is rubbed is also detected to replace a sound in this section with a predicted sound, thereby removing noise. In response to vibrations upon rubbing the camera, the ALC function operates even for the level of a signal detected as a sound by the microphone 7, decreasing a sound in the learning section. To prevent this, the vibration detection unit 111 detects the noise section and sets an ALC-fixed section.

Figure 8A:
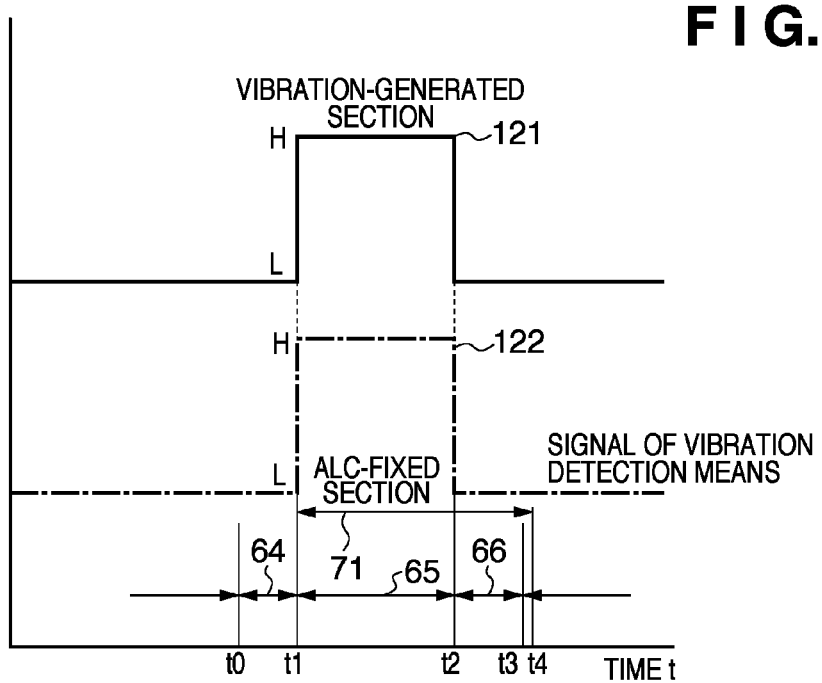
FIGS. 8A and 8B are timing charts for explaining the relationship between generation of noise and the ALC-fixed section.

FIG. 8A is a chart for explaining the timings of a vibration-generated section and ALC-fixed section in the second embodiment. As shown in FIG. 8A, an ALC-fixed section 71 is set, which starts when a signal from the vibration detection unit 111 reaches a predetermined level and ends a predetermined section (for example, 0.05 sec) after the level becomes lower than a predetermined level. In the ALC-fixed section 71, the signal amplification level is fixed to an immediately preceding microphone signal amplification level regardless of a change of the sound pressure of the object sound. Vibration noise in a vibration-generated section 121 is replaced with a high-quality sound predicted from preceding and succeeding learning sections 64 and 66. A difference from FIG. 4B described in the first embodiment is that no ALC level is fixed in the preceding learning section 64. This is because the signal generation timing (vibration-generated section) of the vibration detection unit 111 cannot be predicted. In the second embodiment, the ALC level is stored simultaneously when temporarily storing a recorded sound. If the ALC level varies in the preceding learning section 64, variations of the ALC level are reconstructed and used for prediction.

Figure 8B:
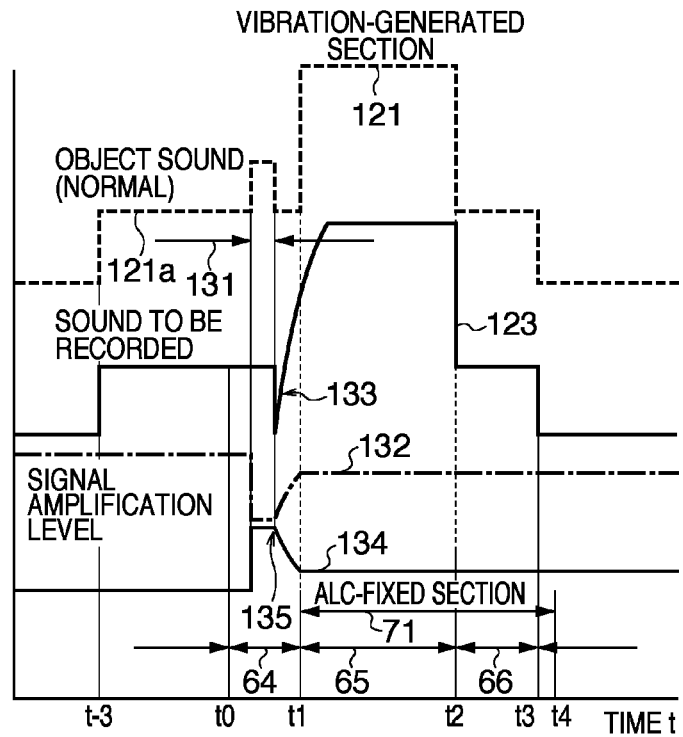

This operation will be explained with reference to FIG. 8B. In FIG. 8B, the abscissas axis represents the elapsed time, and the ordinate axis represents the sound pressure level of the sound or the signal amplification level. At time t−3, an object sound 121a is generated. The object sound 121a instantaneously becomes loud in a section 131. In this case, an ALC signal amplification level 132 drops in this section. However, even if the object sound returns to the original one, the signal amplification level in the gain adjustment unit 41 does not return quickly, and returns with a given time constant, as described above. For this reason, a sound 123 in the section 131 is recorded at a level lower than that of an actual object sound, as represented by a sound 133. When the user manipulates the operation button or rubs the camera, vibrations occur (time t1). In the vibration-generated section 121, the vibration sound is superposed in the object sound. Immediately when a sound gain control unit 47 is notified from the vibration detection unit 111 that the vibrations have been detected, it fixes the signal amplification level (time t1). The sound gain control unit 47 starts the ALC-fixed section 71 from time t1, and continues it till time t4 later than the succeeding learning section 66 by taking account of the succeeding learning section 66 (time t3) after the generated vibrations settle at time t2. This increases the sound prediction precision by stopping variations of the ALC level in the succeeding learning section 66. The succeeding learning section 66 is therefore free from variations of the signal amplification level, preventing a decrease in prediction precision.

In general, the ALC level does not vary before generation of vibrations at time t1, so the prediction precision does not decrease even if the preceding learning section 64 is directly used in prediction. However, when a loud sound is generated instantaneously prior to vibration generation time t1, the ALC level varies, as shown in FIG. 8B. If the sound in the preceding learning section 64 is used, the prediction precision decreases. A measure against this will be explained.

As described above, an object sound is temporarily stored in the memory or the like, undergoes noise processing, and is finally recorded. In the second embodiment, simultaneously as temporarily storing an object sound, the ALC signal amplification level is also stored synchronously. Before performing prediction processing later, the amplification factor of the temporarily stored signal level is restored. In FIG. 8B, a restored signal level 134 is reverse in waveform to the signal amplification level 132. A sound recorded from time 135 (time when the ALC level starts returning) is multiplied by the restored signal level 134. The sound signal after the time 135 returns to the same level as the object sound pressure before time t0. The sound in the vibration-generated section 121 is predicted using a sound at the returned sound pressure level in the preceding learning section 64. A decrease in the precision of a predicted signal can be prevented.

Figure 9A:
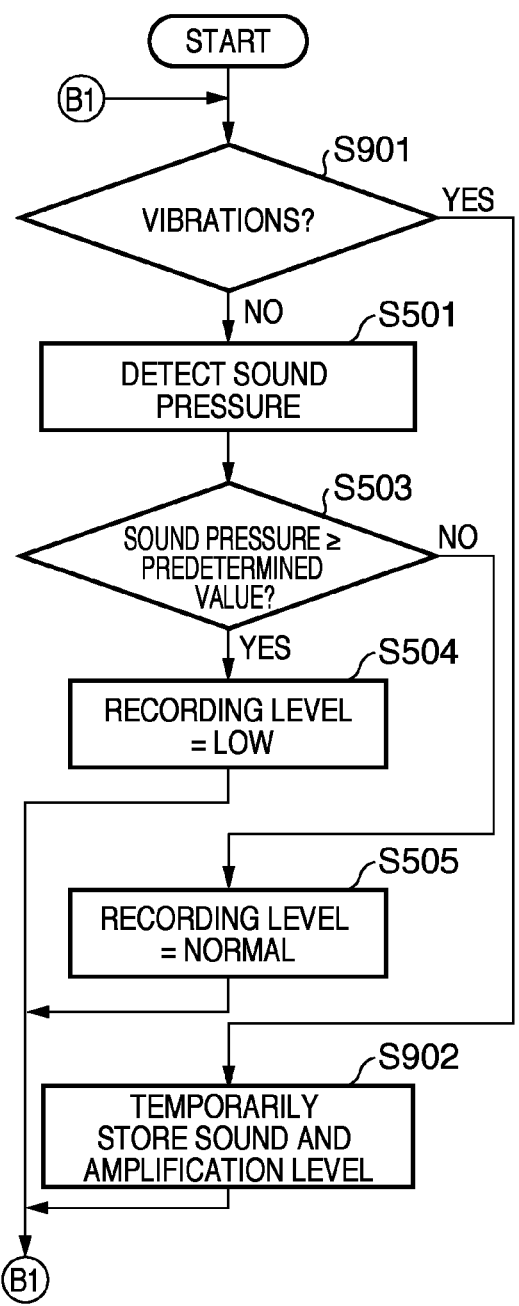
FIGS. 9A and 9B are flowcharts for explaining gain control and noise processing according to the second embodiment.
Figure 9B:
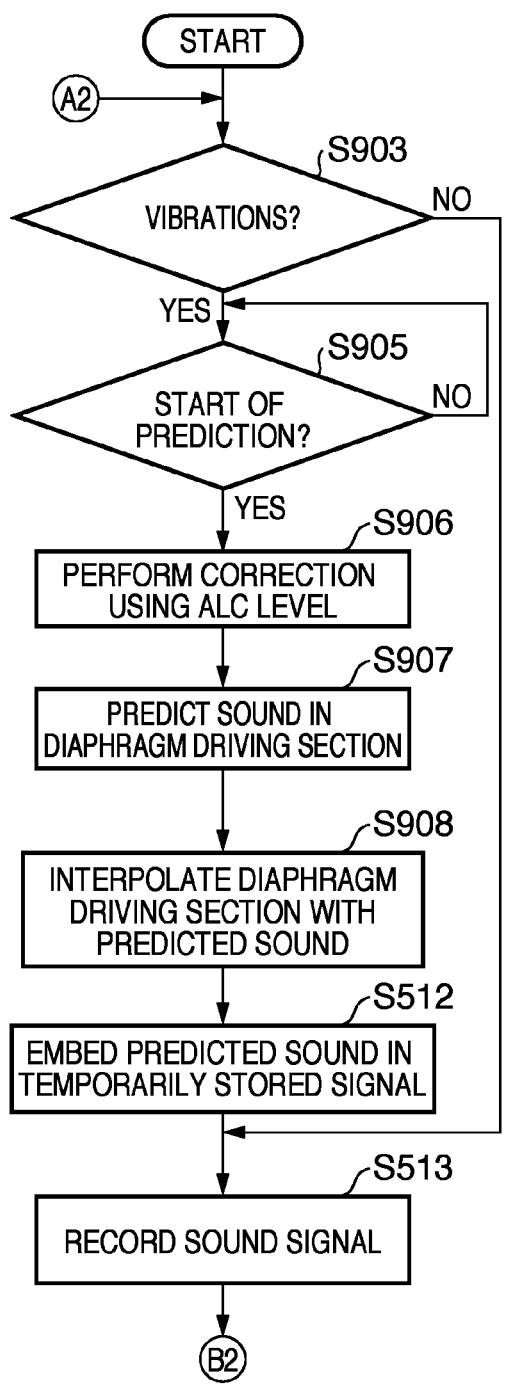

FIGS. 9A and 9B are flowcharts for explaining the operation of the digital camera according to the second embodiment. This process starts when the digital camera starts recording in moving image shooting. For descriptive convenience, the flowcharts of FIGS. 9A and 9B show processes necessary for a description of the second embodiment, and do not show other general processes. The same reference numerals as those in the first embodiment denote the same functional steps.

In step S901, the sound gain control unit 47 determines whether it has received, from the vibration detection unit 111, a signal indicating that vibrations have been detected. If the sound gain control unit 47 has received the detection signal (vibrations have occurred), the process advances to step S902. As a result, steps S503 to S505 are skipped, and the recording level (ALC level) is fixed. In the second embodiment, the sound gain control unit 47 detects a signal from the vibration detection unit 111 and starts an ALC-fixed section 71. The sound gain control unit 47 completes the ALC-fixed section upon the lapse of a period including the period of the learning section 66 and a predetermined margin period after no more vibration is detected by the vibration detection unit 111. Alternatively, the camera system control circuit 25 may generate a signal indicating an ALC-fixed section (vibration-generated section 121+learning section 66+margin period) based on detection of vibrations by the vibration detection unit 111, and send it to the sound gain control unit 47.

If no vibration has occurred, the process advances to step S501. Steps S501 and S503 to S505 are the same as those described in the first embodiment. If the sound gain control unit 47 has received the detection signal (vibrations have occurred), the sound processing circuit 26 records an object sound at a set ALC level and temporarily stores it in step S902. In synchronism with this, the sound processing circuit 26 also temporarily stores an amplification level (ALC level) at that time. The reason why the ALC level is temporarily stored is that variations of the sound pressure caused by variations of the ALC level in the preceding learning section 64 are restored at a simultaneously stored ALC level and that sound prediction is performed using the succeeding learning section 66.

This is gain change control executed in a predetermined period including learning sections before and after the noise-generated section, in order to reduce the influence of variations of the gain on generation of a predicted sound. If necessary, the temporarily stored sound undergoes noise processing to be described below, and is recorded as a recorded sound. In step S903, it is determined whether the detection signal has been received (vibrations have occurred). If it determined in step S903 that the detection signal has been received (vibrations have occurred), the process advances to steps S905 to S908 and S512 to execute noise reduction processing. If it is determined in step S903 that the target section is not a noise section, the process advances to step S513. The process in step S513 is the same as that described in the first embodiment.

If it is determined in step S905 to start prediction, the process advances to step S906. This determination is the same as that in step S509 of FIG. 5B. In step S906, sound signals in the learning sections 64 and 66 before and after the noise section are restored using the ALC level stored in synchronism with recording of the sound. The processes in steps S907 and S908 are the same as those in steps S510 and S511 except that a restored sound signal is used for the learning section 64.

Note that processes shown in FIG. 9B (steps S903 to S513) need not be executed by the digital camera, and a sound signal recorded by the digital camera may be processed by an external information processing apparatus (for example, personal computer). In this case, it is necessary to record signals indicating the recording level set in step S504 or S505, diaphragm driving section, vibration-generated section, and ALC-fixed section on the recording medium together with a sound signal. The external information processing apparatus performs noise processing based on the signals which are recorded together with the sound signal and indicate the recording level, diaphragm driving section, vibration-generated section, and ALC-fixed section.

As described above, according to the second embodiment, changing the gain by the ALC function is inhibited in a period including an entire learning section subsequent to a noise-generated section. The sound in a learning section before the noise-generated section is restored in accordance with a gain level used when the sound was recorded. Thus, the sound in the noise-generated section can be predicted with higher precision and higher quality. It is also possible to set an ALC-fixed section as in the second embodiment for detection of a noise section by the vibration detection unit 111, and fix the ALC level as in the first embodiment for a noise section (for example, driving of the stop), generation of which can be predicted. Needless to say, the technique of the second embodiment can be practiced in combination with that of the first embodiment.

Third Embodiment

In the first and second embodiments, the ALC level is fixed when noise is generated. The third embodiment prevents a decrease in the precision of a succeeding learning section 66 by quickly recovering the ALC level in a section where noise is generated and a predetermined subsequent period, instead of fixing the ALC level.

Figure 10:
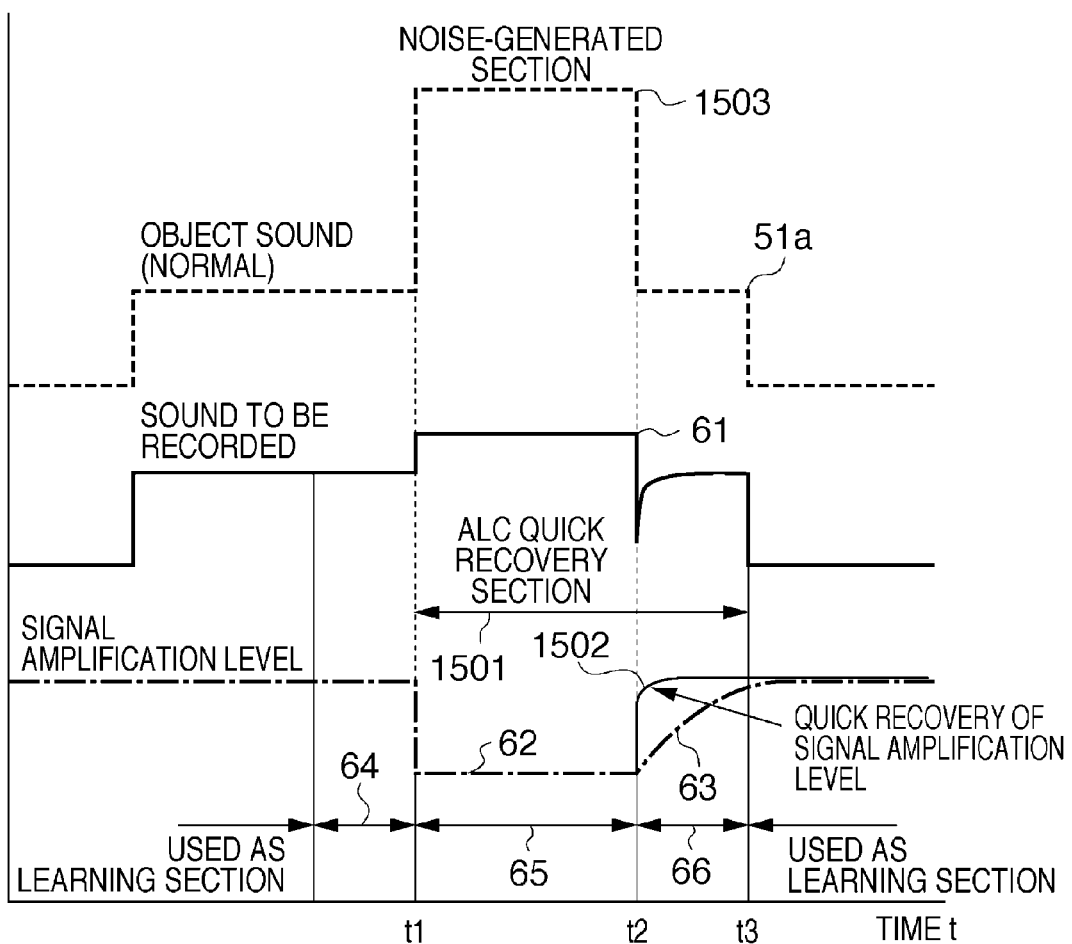
FIG. 10 is a timing chart for explaining the ALC quick recovery section.

When an object sound as shown in FIG. 10 is recorded, a reference sound (sound 61 to be recorded) in a preceding learning section 64 is identical to an object sound 51a. Thus, sound prediction in a deletion section 65 (deletion section 52 in FIG. 3) using this reference sound can be executed with high precision. In contrast, a reference sound (sound 61 to be recorded) in the succeeding learning section 66 greatly differs from the object sound 51a. This is because the ALC level is recovered slowly, as described above. Thus, the sound prediction precision in the deletion section 65 using the reference sound decreases greatly. To prevent this, the third embodiment sets, as an ALC quick recovery section 1501, a section including a noise-generated section 1503 serving as a diaphragm driving section or a vibration-generated section detected by a vibration detection unit 111, and the succeeding learning section 66. As represented by a signal amplification level waveform 1502, the ALC gain recovers quickly, compared to the conventional signal amplification level waveform 63. The influence of variations of the ALC level on a reference sound in the succeeding learning section 66 can be reduced.

Accordingly, the sound to be recorded and the object sound substantially coincide with each other even in the succeeding learning section 66. Noise in the noise-generated section 1503 is replaced with a high-quality sound predicted from the preceding and succeeding learning sections 64 and 66.

Figure 11:
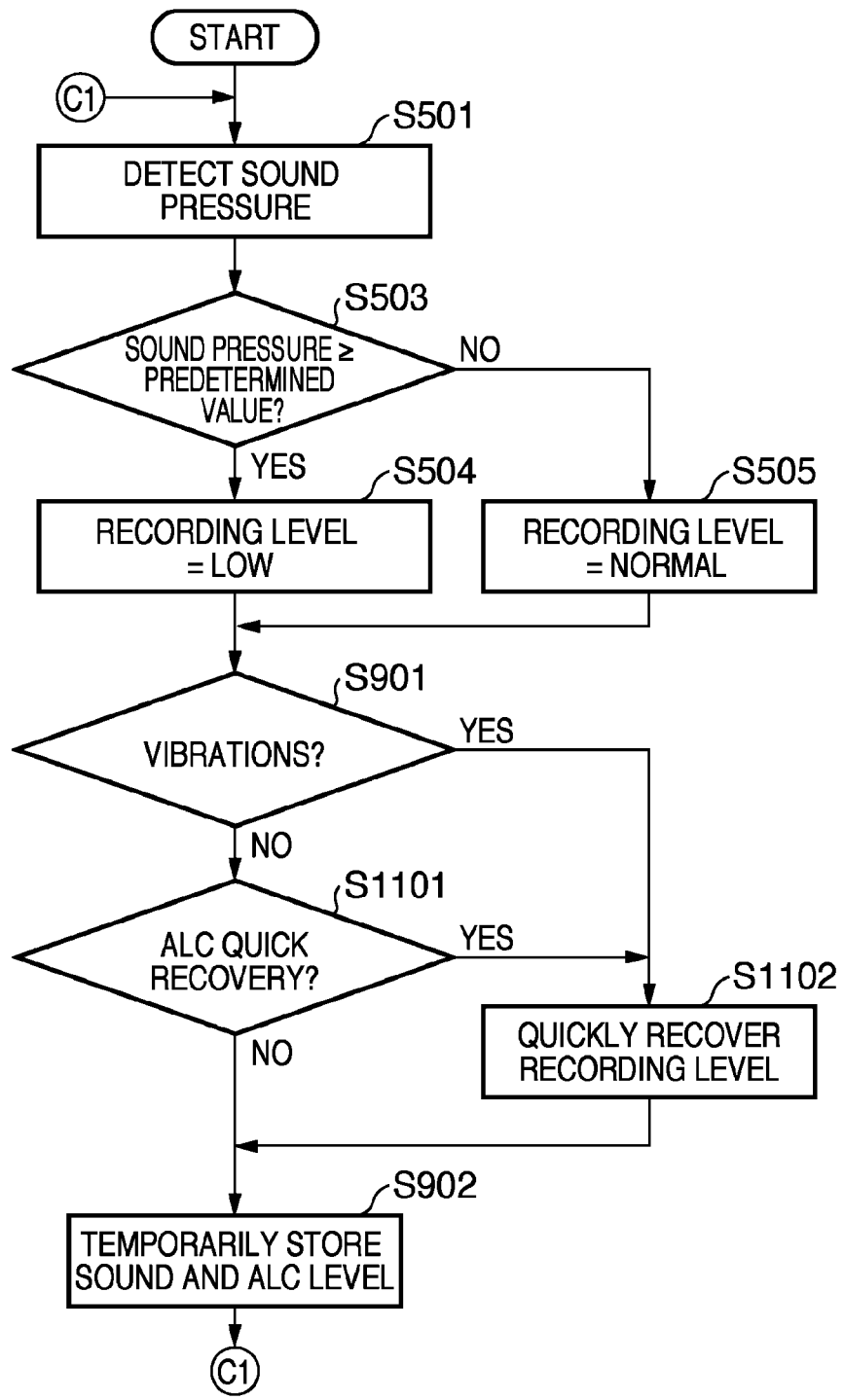
FIG. 11 is a flowchart for explaining gain control according to the third embodiment.

FIG. 11 is a flowchart of noise processing according to the third embodiment. This sequence starts when the digital camera starts recording in moving image shooting. For descriptive convenience, the flowchart of FIG. 11 shows processes necessary for a description of the third embodiment, and does not show other general processes. The same reference numerals as those in the first and second embodiments denote the same functional steps.

In the third embodiment, no ALC level is fixed, so adjustment of the recording level (ALC) in S501 and S503 to S505 is always executed. If the vibration detection unit 111 detects vibrations in step S901, or if it is determined in step S1101 that the target section is an ALC quick recovery section, the process advances to step S1102. Note that the ALC quick recovery section is a period corresponding to the ALC-fixed section in the first and second embodiments. In step S1102, if the ALC level varies, the sound processing circuit 26 quickly returns the ALC level to one before vibrations were generated or before driving the stop, that is, before the ALC quick recovery section.

Noise processing and sound recording are the same as those in FIG. 9B. More specifically, in sound prediction, a sound signal obtained by correcting a sound signal using a recorded ALC level is used for the learning section 64. For the learning section 66, a temporarily recorded sound signal is directly used because a sound signal with an almost constant gain is obtained by quick recovery.

As described above, according to the third embodiment, the ALC function recovers the gain (shifts it to a higher level) quickly in a period including an entire learning section subsequent to a noise-generated section. In general, the sound pressure increases and the signal amplification level decreases in the noise-generated section, and the gain is recovered in the learning section. By setting the learning section as a quick recovery section, variations of the gain in the learning section are reduced. The sound in the noise-generated section can be predicted with higher precision and higher quality.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-174740, filed Jul. 27, 2009, which is hereby incorporated by reference herein in its entirety.

What is claimed is:

1. A sound recording apparatus having a driving unit, comprising:
   a sound collection unit configured to generate a sound signal from an input sound;
   a detection unit configured to detect a level of the sound signal;
   an adjustment unit configured to adjust a level of the sound signal at an amplification factor corresponding to the detected level of the sound signal;
   a processing unit configured to process the sound signal adjusted by said adjustment unit to prevent a sound signal amplified by said adjustment unit from containing a sound signal generated upon driving the driving unit; and
   a control unit configured to control driving of the driving unit, said adjustment unit, and said processing unit,
   wherein said control unit controls said processing unit to replace a sound signal in a predetermined period that begins after instructing driving of the driving unit with a signal calculated from a sound signal included in a first period that begins after the predetermined period has elapsed, and controls said adjustment unit to substantially equalize an amplification factor when driving of the driving unit is instructed and an amplification factor in the first period.

2. The apparatus according to claim 1, wherein said control unit inhibits changing the amplification factor by said adjustment unit before a lapse of the first period after instructing driving of the driving unit.

3. The apparatus according to claim 1, wherein the predetermined period is longer than a period during which a sound is generated upon driving the driving unit.

4. The apparatus according to claim 1, wherein when the predetermined period ends, said control unit controls said adjustment unit to adjust the amplification factor to an amplification factor when driving of the driving unit is instructed.

5. The apparatus according to claim 1, further comprising a vibration detection configured to detect vibrations of the apparatus,
   wherein the predetermined period is a period during which said vibration detection unit detects vibrations.

6. The apparatus according to claim 1, wherein the driving unit is a motor which drives a lens.

7. A sound recording apparatus having a driving unit, comprising:
   a sound collection unit configured to generate a sound signal from an input sound;
   a detection unit configured to detect a level of the sound signal;
   an adjustment unit configured to adjust a level of the sound signal at an amplification factor corresponding to the detected level of the sound signal;
   a processing unit configured to process the sound signal adjusted by said adjustment unit to prevent a sound signal amplified by said adjustment unit from containing a sound signal generated upon driving the driving unit; and
   a control unit configured to control driving of the driving unit, said adjustment unit, and said processing unit,
   wherein said control unit controls said processing unit to replace a sound signal in a predetermined period that begins after instructing driving of the driving unit with a signal calculated from a sound signal included in a first period that begins after the predetermined period has elapsed, and controls said adjustment unit to increase the amplification factor more quickly at least in the first period than in a remaining period.

8. The apparatus according to claim 7, wherein the predetermined period is longer than a period during which a sound is generated upon driving the driving unit.

9. The apparatus according to claim 7, further comprising a vibration detection unit configured to detect vibrations of the apparatus,
  wherein the predetermined period is a period during which said vibration detection unit detects vibrations.

10. The apparatus according to claim 7, wherein the driving unit is a motor which drives a lens.

11. A sound recording method in a sound recording apparatus having a driving unit, the method comprising:
  a sound collection step of generating a sound signal from an input sound;
  a detection step of detecting a level of the sound signal;
  an adjustment step of adjusting a level of the sound signal at an amplification factor corresponding to the detected level of the sound signal;
  a processing step of processing the sound signal adjusted in the adjustment step to prevent a sound signal amplified in the adjustment step from containing a sound signal generated upon driving the driving unit; and
  a control step of controlling driving of the driving unit, and processes in the adjustment step and the processing step,
  wherein in the control step, the processing step is controlled to replace a sound signal in a predetermined period that begins after instructing driving of the driving unit with a signal calculated from a sound signal included in a first period that begins after the predetermined period has elapsed, and the adjustment step is controlled to substantially equalize an amplification factor when driving of the driving unit is instructed and an amplification factor in the first period.

12. A sound recording method in a sound recording apparatus having a driving unit, the method comprising:
  a sound collection step of generating a sound signal from an input sound;
  a detection step of detecting a level of the sound signal;
  an adjustment step of adjusting a level of the sound signal at an amplification factor corresponding to the detected level of the sound signal;
  a processing step of processing the sound signal adjusted in the adjustment step to prevent a sound signal amplified in the adjustment step from containing a sound signal generated upon driving the driving unit; and
  a control step of controlling driving of the driving unit, and processes in the adjustment step and the processing step,
  wherein in the control step, the processing step is controlled to replace a sound signal in a predetermined period that begins after instructing driving of the driving unit with a signal calculated from a sound signal included in a first period that begins after the predetermined period has elapsed, and the adjustment step is controlled to increase the amplification factor more quickly at least in the first period than in a remaining period.

* * * * *